(12) United States Patent
Birk et al.

(10) Patent No.: US 7,804,413 B2
(45) Date of Patent: Sep. 28, 2010

(54) OBJECT AWARENESS DETERMINATION SYSTEM AND A METHOD FOR DETERMINING AWARENESS OF AN OBJECT

(75) Inventors: Wolfgang Birk, Gammelstad (SE); Mattias Erik Brannstrom, Göteborg (SE); Daniel Levin, Göteborg (SE); Andreas Eidehall, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 439 days.

(21) Appl. No.: 11/851,706

(22) Filed: Sep. 7, 2007

(65) Prior Publication Data

US 2008/0061999 A1 Mar. 13, 2008

(30) Foreign Application Priority Data

Sep. 8, 2006 (EP) .................... 06120345

(51) Int. Cl.
*G08B 23/00* (2006.01)
(52) U.S. Cl. .............. 340/576; 340/575; 340/435; 340/436; 340/438; 701/301
(58) Field of Classification Search .......... 340/576, 340/435, 436, 575, 539.25, 686.1, 438; 701/300, 701/301; 180/274; 382/103
See application file for complete search history.

(56) References Cited

U.S. PATENT DOCUMENTS

| | | | | |
|---|---|---|---|---|
| 6,989,754 | B2 * | 1/2006 | Kisacanin et al. | 340/576 |
| 7,468,653 | B2 * | 12/2008 | Takahashi | 340/435 |
| 2004/0159514 | A1 | 8/2004 | Dernebo | |
| 2004/0178890 | A1 | 9/2004 | Williams et al. | |

FOREIGN PATENT DOCUMENTS

| | | |
|---|---|---|
| DE | 10135742 | 2/2003 |
| EP | 1484014 | 12/2004 |
| JP | 09 007100 | 10/1997 |

* cited by examiner

*Primary Examiner*—Anh V La
(74) *Attorney, Agent, or Firm*—Frank A. MacKenzie; Brooks Kushman P.C.

(57) ABSTRACT

An object awareness determination system includes an external object sensor system to sense objects and generate input data relating to the objects external to a host vehicle, wherein the input data includes an object position (x, y), an object velocity $|(\dot{x}, \dot{y})|$ and an object direction of movement $((\dot{x}, \dot{y})/|(\dot{x}, \dot{y})|)$ associated with each object in said detecting range. Additionally, the system includes a controller for determining awareness of the user to an object that recently entered the detecting range of the external object sensor system, and a method for determining awareness of the object.

24 Claims, 1 Drawing Sheet

OBJECT AWARENESS DETERMINATION SYSTEM AND A METHOD FOR DETERMINING AWARENESS OF AN OBJECT

TECHNICAL FIELD

The invention relates to an object awareness determination system according to the preamble of claim 1. The invention furthermore relates a method for determining awareness of an object according to the preamble of claim 14.

BACKGROUND ART

Modern vehicles are increasingly becoming equipped with active safety systems such as collision warning systems, lane keeping assistance, and automated braking. Also systems that perform automated steering in order to avoid collisions have been suggested. A problem related to active safety systems that intervenes the driver, either only via sending an alarm signal to the driver, or via intervention in the command over the vehicle, is that any unnecessary intervention by the active safety system reduces the driving comfort and may become annoying to the driver. A driver may find a vehicle equipped with such a system unreliable. A further problem related to active safety systems is to decide when to intervene. If intervention is made early, intervention may be made by use of small corrections as regards braking effect or yaw angle correction. However, for early interventions predictions of the paths of external objects must be performed for a longer period of time, which decreases the accuracy of the path predictions. One reason for the decreased accuracy is that the objects or the host vehicle may perform more voluntary corrections under a longer period than a shorter, which corrections may not be accounted for in the path prediction. Early intervention may therefore lead to unnecessary or incorrect intervention. If intervention is made at a late stage, intervention must be made by use of large forces, in the event intervention in the command over the vehicle is performed. On the other hand, if an alarm signal is sent to the driver, correction must be made by the driver by use of large forces. Finally the intervention may be made to late such that it is no longer possible to avoid a particular situation.

Since drivers are constantly adapting to a traffic situation by assessing the situation for following the road, avoiding objects and selecting appropriate speed by accelerating or braking, information about which objects the driver is aware of is a great importance for determining how an active safety system should intervene. Generally intervention by active safety systems is far more accepted by drivers when intervention concerns avoiding objects and situations that the driver was not aware of. For this reason intervention can be allowed at an early stage for objects that the driver was not aware of, while intervention can be made at a late stage for objects that the driver was aware of.

Awareness of an object may be determined by first locating the object by an external object sensor system arranged on a host vehicle. The sensor system determines a direction toward the object. An eye gaze monitor determines the direction of gaze of the driver of the host vehicle. A comparator determines that the driver observes the object if the direction of the gaze of the driver corresponds to the direction toward the object. When having observed the object the driver will be assumed to be aware of the object for a period of time from the time of observation.

The detecting range of commercially available sensor systems for object detection is relatively limited. While it may be possible to detect position and velocity of an object at a relatively large distance, that is around 150 m or more, it is more difficult to determine the type of object at a large distance. A typical value for reliable detection of objects, including detection of position, velocity and type of object, is typically less than 50 m. Traffic scenarios frequently include objects moving at high speed relative to the host vehicle. Vehicles running in the opposite direction of the host vehicle may approach the host vehicle at speeds exceeding 50 m/s relative to the host vehicle under normal circumstances. Considering that traffic scenarios may includes objects moving at high speed relative to the host vehicle, the short detection range of the sensor system makes it difficult to accurately determine whether the driver of the host vehicle is aware of an external object or not, and furthermore makes it difficult to based on determined awareness of the object to separate between early intervention and late intervention of an active safety system.

SUMMARY

It is an object of the invention to provide an improved object awareness system, which more accurately will separate objects that the driver is aware of from objects that the driver is not aware of.

This object is achieved by an object awareness system according to claim 1.

The object awareness system according to the invention includes an external object sensor system arranged on a host vehicle. The sensor system is arranged to, within a detecting range of said sensor system, sense objects and generate input data relating to objects external to said host vehicle, wherein said input data include an object position (x, y), an object velocity $|(\dot{x}, \dot{y})|$ and an object direction of movement $((\dot{x}, \dot{y})/|(\dot{x}, \dot{y})|)$ associated with each object in the detecting range.

The object awareness determination system further comprises a controller for determining awareness of the user to an object that recently have entered the detecting range of the external object sensor system. The controller is arranged to determine awareness of said object based on an assessed observation of the recently entered object by the user before the object has entered the detecting range of said external object sensor system.

Since the observation of the object which recently have been detected is made before the sensor system is aware of the object, it is not possible to directly compare a current direction of gaze of a driver with a current position of the external object, in stead an assessment must be made where a past direction of gaze of the driver is compared with a past position of the external object. In the event it can be established that the driver at a point in time before the external object entered the detecting range looked in a direction toward where the external object was positioned at that point in time, an assessed observation has been made.

With the expression "recently have entered the detecting range" is intended that the object has entered into the detecting range such that relevant input data concerning the object, including position and speed and optionally acceleration may be determined. In some know sensor systems these input data may be determined at entry into the detecting range, while other systems relies on a plurality of samples in order to determine speed and acceleration. Since accuracy of estimation of past trajectories decreases with increased distance from the time of observation it is preferred to base the past trajectory estimation on an observation made as early as possible. For this reason, the past trajectory should preferably be based on an observation of the external object made at its entry into the detecting range or at least based on an early set of observations made by the sensor systems.

The object awareness determination system thus determines awareness by the driver of an object, not only on observations made by the driver when the objects are within the detecting range of the external object sensor system, but also relies on observations, by the driver of objects made outside the detecting range of the external object sensor system.

In the system according to the invention, it is determined, as soon as or recently after an object has entered the detecting range of the sensor system whether the driver had observed the object before the object entered the detecting range.

In a particularly preferred embodiment of the invention the object awareness determination system further comprises:

an eye gaze monitor arranged for determining the direction of gaze of a user, a host vehicle movement tracker arranged on the host vehicle, which host vehicle movement tracker is arranged to record host vehicle position and host vehicle yaw angle;

an eye gaze recorder arranged for, recording the direction of gaze of a user, determined by the eye gaze monitor;

a past trajectory estimator which is arranged to, after entry of an object into said detecting range of said external object sensor system, estimate the past trajectory of said object within a time span $[t_{-n}, t_0]$ preceding a time of first entry $(t_0)$ of said object into said detecting range, wherein said controller is arranged to determine awareness of said object based on an assessed observation, which observation is being assessed by use of recorded host vehicle position, host vehicle yaw angle, recorded direction of gaze of the user, and estimated past trajectory of the object which has entered the detecting range of the external object sensor system.

In this embodiment, the object awareness determination system records the direction of gaze of the driver, the host vehicle position and the yaw angle of the vehicle. When an external object appears in the detecting range of the sensor system a past trajectory of the external object is calculated.

From the calculated past trajectory and the recorded direction of gaze of the driver, the host vehicle position and the yaw angle of the vehicle, the controller may determine whether the driver had observed the external object before it entered the detecting range. The comparator determines that the driver had observed the object if the direction of the gaze of the driver at some time before entry into the detection range, the direction of gaze of the driver corresponded to the direction toward the object at that time. When having observed the object the driver will be assumed to be aware of the object for a period of time from the time of observation.

Further embodiments of the invention are being defined in the dependent claims.

The invention furthermore relates to a method for determination of awareness of external objects.

BRIEF DESCRIPTION OF DRAWINGS

The invention will be described in further detail together with references to appended drawings where.

SPECIFICATION

Figure 1:
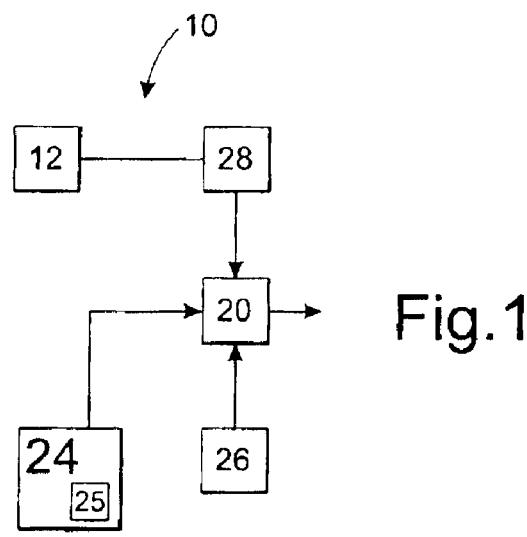
FIG. 1 is a block scheme of an object awareness determination system according to the invention.
Figure 2:
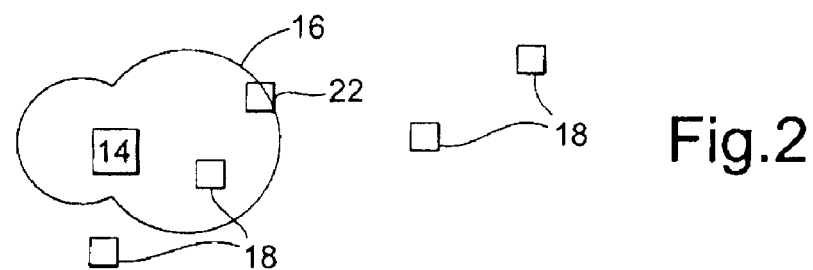
FIG. 2 shows a traffic situation including a host vehicle and a set of external objects.

The object determination system will initially be described with references to FIG. 1, which shows a block scheme of an object awareness determination system 10 according to the invention, and FIG. 2, which shows a traffic situation including a host vehicle and a set of external objects. The object awareness determination system 10 includes an external object sensor system 12 arranged on a host vehicle 14. The sensor system 12 is arranged to, within a detecting range 16 of sensor system 12, sense objects and generate input data relating to objects external 18 to the host vehicle, wherein said input data include an object position (x, y), an object velocity $|(\dot{x}, \dot{y})|$ and an object direction of movement $((\dot{x}, \dot{y})/|(\dot{x}, \dot{y})|)$ associated with each object 18 in the detecting range 16. Sensor systems providing the relevant input data are commercially available and well known to persons skilled in the art. A suitable system is sold under the trade name Mobil Eye.

The object awareness determination system 10 furthermore includes a controller 20 for determining awareness of the user to an object 22 that recently have entered the detecting range 16 of the external object sensor system. The controller 20 is arranged to determine awareness of the object 22 which have recently entered the detecting range 16 of the sensor system 12 based on an assessed observation of the recently entered object 18 by the user before the object has entered the detecting range 16 of said external object sensor system. With the expression "recently have entered the detecting range" is intended that the object has entered into the detecting range such that relevant input data concerning the object, including position and speed and optionally acceleration may be determined. In some know sensor systems these input data may be determined at entry into the detecting range, while other systems relies on a plurality of samples in order to determine speed and acceleration. Since accuracy of estimation of past trajectories decreases with increased distance from the time of observation it is preferred to base the past trajectory estimation on an observation made as early as possible. For this reason, the past trajectory should preferably be based on an observation of the external object made at its entry into the detecting range or at least based on an early set of observations made by the sensor systems. If the sensor system only may determine position, two consecutive observations will be needed in order to determine velocity and three will be needed in order to determine the acceleration of the external object. A suitable sampling interval for the sensor system is at least 10 Hz. The position, velocity and acceleration may the be determined within approximately 0.2 seconds from entry into the detecting range. If the sensor system may detect the velocity of an object The position, velocity and acceleration may the be determined within approximately 0.1 seconds from entry into the detecting range by using a sampling rate of 10 Hz The object awareness determination system 10 further includes an eye gaze monitor 24 arranged for determining the direction of gaze $\phi_{rel}$ of a user relative to the host vehicle. Eye gaze monitors 24 are well known in the art. Eye gaze monitors are used to determine the direction of gaze of the user relative to the host vehicle. In order to determine the absolute direction of gaze $\phi_{abs}$ of the driver the host vehicle yaw angle $\psi$ relatively to the road must be determined. The host vehicle yaw angle $\psi$ and host vehicle position (x,y) is determined by a host vehicle movement tracker 26 arranged on the host vehicle 14. The absolute direction of gaze can be calculated as $\phi_{abs}=\phi_{rel}+\psi$. Host vehicle movement trackers are well known in the art. The host vehicle movement tracker 26 is arranged to determine past host vehicle position and past host vehicle yaw angle, preferably by use of recorded past host vehicle yaw angle and the calculation based on the model below.

An eye gaze recorder 25 arranged for recording the direction of gaze of a user determined by the eye gaze monitor is included in the system.

A past trajectory estimator 28 is included in the object awareness determination system. The past trajectory estimator 28 is arranged to, after entry of an object into the detecting range 16 of the external object sensor system 12, estimate the past trajectory of the object which has recently entered into the detecting range 16 within a time span $[t_{-n}, t_0]$ preceding a time of first entry ($t_0$) of said object into said detecting range.

The past trajectory estimator 28 is arranged to, for each object that have recently entered the detecting range, retrieve object position (x, y), object velocity $|(\dot{x}, \dot{y})|$ and object direction of movement $((\dot{x}, \dot{y})/|(\dot{x}, \dot{y})|)$ at or after the time of first entry ($t_0$), from said external object sensor system, and to determine the past trajectory based on the (x, y), object velocity $|(\dot{x}, \dot{y})|$ and object direction of movement $((\dot{x}, \dot{y})/|(\dot{x}, \dot{y})|)$ at or after the time of first entry ($t_0$).

The past trajectory estimator 28 may estimate the object position $(x, y)(t_{-x})$ at a point of time $t_{-x}$ within said time span $[t_{-n}, t_0]$ preceding a time of first entry ($t_0$) as:

$$(x, y)(t_{-i}) = (x, y)(t_0) - (\dot{x}, \dot{y})(t_0)\Delta t - (\ddot{x}, \ddot{y})(t_0)\frac{\Delta t^2}{2},$$

where the acceleration $(\ddot{x}, \ddot{y})(t_0)$, may be detected by the external object sensor system, calculated from change detected external object velocities or neglected. Here $t_{-i}$ is a set of discrete point in time before an external object has entered the detecting range 16, which set of points in time forms a time span $[t_{-n}, t_{-1}]$. The time span is delimited by the end point $t_{-n}$ since the information available concerning the movement of the external object does not allow accurate estimation of the past position of the external object for very long time spans. $\Delta t$ is $t_0 - t_{-i}$.

The controller 20 is arranged to determine awareness of an object 22 that have recently entered into the detecting range based on an assessed observation, which observation is being assessed by use of a past host vehicle position $(x,y)_{host,past}$, host vehicle yaw angle $\psi_{rec}$, recorded direction of gaze $\phi_{rel,rec}$ of the user, and estimated past trajectory of the object $(x,y)_{obj,est}$ which has entered the detecting range 16 of the external object sensor system. The past trajectory of the host vehicle may be a recorded position given by GPS sensor, a recorded position given by a vehicle tracking system or calculated from data representing the motion of the vehicle. A calculation may be based on a Newtonian model as for the external object, preferably, since recorded vehicle yaw angle may be available a calculation based on the following model should be used since very accurate past host vehicle positions may be obtained:

$$\varphi_{-i,rec} = -\sum_{k=0}^{-i} \Psi_{abs,-k} T_s$$

$$(x', y')_{-i;host,rec} = \sum_{k=0}^{-i} \begin{pmatrix} \cos\varphi_{-k} \\ \sin\varphi_{-k} \end{pmatrix} v_{-k} T_s$$

Here $(x',y')_{-i;host,rec}$ is the past position $(x,y)_{host, past}$ of the host vehicle at discrete points in time $-i$, $T_s$ is the sample interval; $\dot{\psi}_{abs,-k}$ is the absolute host vehicle yaw angle rate at time $t_{-k}$; $\phi_{-i,rec}$ the yaw angle at time $t_{-i}$; $(x',y')_{-i;host,rec}$ is the position of the host vehicle at time $t_{-i}$; $\phi_{-k}$ is the yaw angle at time $t_{-k}$.

Figure 3:
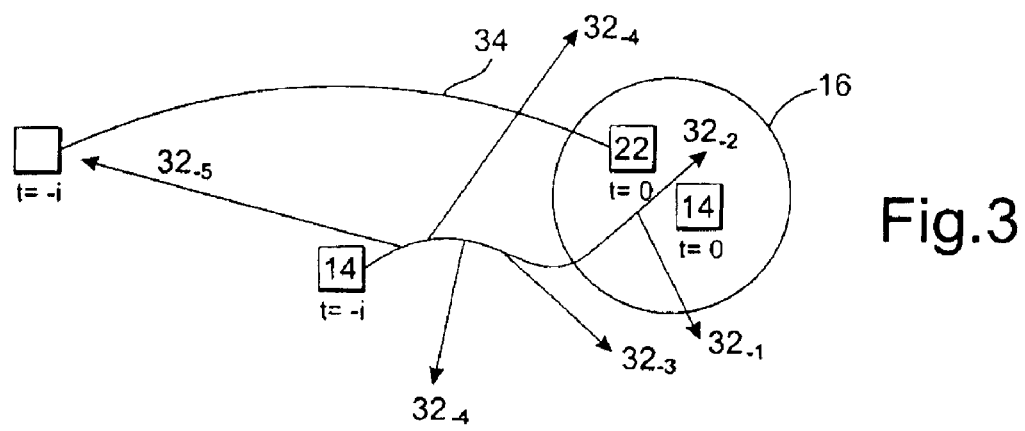
FIG. 3 shows a recorded host vehicle movement track including recorded host vehicle position and host vehicle yaw angle and recorded direction of gaze of the user within a time span $[t_{-n}, t_0]$ preceding a time of first entry $(t_0)$ of an external object into a detecting range of the sensor system 12 arranged on the host vehicle.

In FIG. 3 a recorded host vehicle movement track 30 including recorded host vehicle position and host vehicle yaw angle is shown. A set of recorded direction of gaze $32_{-5}$–$32_{-1}$ of the user within a time span $[t_{-n}, t_0]$ preceding a time of first entry ($t_0$) of an external object into a detecting range of the sensor system 12 arranged on the host vehicle are shown. A past trajectory 34 of the external object 22 estimated by the past trajectory estimator 28 for the angle is shown. A set of recorded directions of gaze $32_{-5}$–$32_{-1}$ of the user, within a time span $[t_{-n}, t_{-1}]$ preceding a time of first entry ($t_0$) of an external object into a detecting range, is indicated on the drawing. As may be noted the absolute direction of gaze $\phi_{abs}$ corresponds to the direction of the external object for the recorded direction of gaze $32_{-5}$. The controller may thus determine that the driver observed the external object before entry into the detecting range of the sensor system by using recorded host vehicle position and yaw angle, recorded direction of gaze of the driver and an estimated past trajectory of the external object that recently had entered the detecting range of the sensor system. The controller may determine that the user is observing the object at the point of time $t_{-i}$ within said time span $[t_{-n}, t_{-1}]$ preceding a time of first entry ($t_0$) if the object position is within a sector around said absolute direction of gaze at the point of time $t_{-i}$. A relevant size of sector may be around ±2°. A further requirement of that the object must be within the sector during a predetermined minimum interval, which suitably may be 30 ms. A single observation at a single point in time may also be sufficient for the purposes of this invention.

In practice, the time span $[t_{-n}, t_{-1}]$ includes a set of discrete points of time $t_i\{i=-n:-1\}$, wherein the past trajectory estimator is arranged to determine the object position $(x, y)(t_i)$ at said discrete points of time $t_i\{i=-n:-1\}$. The controller 20 is arranged to determine that the user is observing the object within the time span $[t_{-n}, t_{-1}]$ preceding a time of first entry ($t_0$) if the object position $(x, y)(t_i)$ is within a sector around the absolute direction of gaze at any of said discrete points of time $t_i\{i=-n:-1\}$.

In one embodiment of the invention, the controller 20 is arranged to start with determining if the user is observing the object at a point of time ($t_{-1}$) immediately preceding said time of first entry ($t_0$), and to continue with points of time $t_i$ consecutively being more distant from time of first entry ($t_0$). The controller may be arranged to stop the evaluation for points of times being more distant from the time of first entry ($t_0$) than a point of time $t_{-i}$ as soon as the controller has determined that the user is observing the object at the point of time $t_{-i}$ due to that the object position is determined to be within a sector around said absolute direction of gaze at the point of time $t_{-i}$ A suitable size of the time span $[t_{-n}, t_0]$ preceding a time of first entry ($t_0$) of an external object into a detecting range of the sensor system 12, during which the past trajectory of the external object is estimated is around 2-10 seconds, preferably around 5 seconds.

Instead of using a fixed time interval, the size of the interval may depend on the velocity of the host vehicle or of an aggregated average value of the velocities of the external objects observed by the sensor system.

The invention claimed is:

1. An object awareness determination system comprising:
   an external object sensor system on a host vehicle and sensing an object external to the host vehicle and generating input data relating to the object, the input data including an object position, an object velocity $|(\dot{x}, \dot{y})|$ and an object direction of movement $((\dot{x}, \dot{y})/|(\dot{x}, \dot{y})|)$
   an eye gaze monitor determining a direction of gaze ($\phi_{rel}$) of a user;
   an eye gaze recorder recording the direction of gaze ($\phi_{rel, -i}$);
   a past trajectory estimator which, after entry of the object into a detecting range of the external object sensor system, estimates a past trajectory of the object within a time span $[t_{-n}, t_{-1}]$ preceding a time of first entry ($t_0$) of the object into the detecting range;
   a host vehicle movement tracker determining a past host vehicle position $((x,y)_{host, past})$ and a past host vehicle yaw angle ($\phi_{-i}$); and
   a controller determining awareness of the user to the object before the object has entered the detecting range based on an assessed observation by using the past host vehicle position $((x,y)_{host, past})$, the past host vehicle yaw angle ($\phi_{-i}$), the recorded direction of gaze ($\phi_{rel, -i}$), and the estimated past trajectory of the object.

2. An object awareness determination system according to claim 1, characterised in that said controller retrieves, for a point of time $t_{-i}$ within said time span $[t_{-n}, t_{-1}]$, an object position $(x, y)(t_i)$ from said past trajectory estimator, a past host vehicle position $((x,y)_{host, past})$ and a past host vehicle yaw angle ($\phi_{-i}$) from said host vehicle movement tracker, and a recorded direction of gaze ($\phi_{rel, -i}$) from the eye gaze recorder.

3. An object awareness determination system according to claim 2, characterised in that said controller is arranged to retrieve an absolute direction of gaze ($\phi_{abs, -i}$) for a point of time $t_{-i}$ within said time span $[t_{-n}, t_{-1}]$ from a recorded direction of gaze ($\phi_{rel, -1}$) and a recorded host vehicle yaw angle $\phi_{-I,rec}$ at said point of time $t_{-1}$.

4. An object awareness determination system according to claim 3, characterised in that said controller is arranged to determine that the user is observing the object at the point of time $t_{-i}$ within said time span $[t_{-n}, t_{-1}]$ if the object position $(x, y)(t_i)$ is within a sector around said absolute direction of gaze ($\phi_{abs, -i}$) at the point of time $t_{-i}$.

5. An object awareness determination system according to claim 4, characterised in that said time span $[t_{-n}, t_{-1}]$ includes a set of discrete points of time $t_i\{i=-n:-1\}$, that said past trajectory estimator is arranged to determine the object position $(x, y)(t_{-i})$ at said discrete points of time $t_i\{i=-n:-1\}$, and that said controller is arranged to determine that the user is observing the object within said time span $[t_{-n}, t_{-1}]$ preceding a time of first entry ($t_0$) if the object position $(x, y)(t_{-i})$ is within a sector around the absolute direction of gaze ($\phi_{abs, -i}$) at any of said discrete points of time $t_i\{i=-n:-1\}$.

6. An object awareness determination system according to claim 5, characterised in that said controller is arranged to start with determining if the user is observing the object at a point of time ($t_{-1}$) immediately preceding said time of first entry ($t_0$), and to continue with points of time t, consecutively being more distant from time of first entry ($t_0$).

7. An object awareness determination system according to claim 6, characterised in that said controller is arranged to stop the evaluation for points of times being more distant from the time of first entry ($t_0$) than a point of time $t_{-i}$ as soon as the controller has determined that the user is observing the object at the point of time $t_{-i}$ due to that the object position is determined to be within a sector around said absolute direction of gaze at the point of time $t_{-i}$.

8. An object awareness determination system according to claim 1, characterised in that said past trajectory estimator, retrieves an object position $(x, y)$, an object velocity $|(\dot{x}, \dot{y})|$ and an object direction of movement $((\dot{x}, \dot{y})/|(\dot{x}, \dot{y})|)$ at or after the time of first entry ($t_0$), from said external object sensor system, and determines the past trajectory based on the object position $(x, y)$, object velocity $|(\dot{x}, \dot{y})|$ and object direction of movement $((\dot{x}, \dot{y})/|(\dot{x}, \dot{y})|)$ at or after the time of first entry ($t_0$).

9. An object awareness determination system according to claim 8, wherein the past trajectory estimator estimates the object position $(x, y)(t_{-i})$ at a point of time $t_{-i}$ within said time span $[t_{-n}, t_{-1}]$ as:

$$(x, y)(t_{-i}) = (x, y)(t_0) - (\dot{x}, \dot{y})(t_0)\Delta t - (\ddot{x}, \ddot{y})(t_0)\frac{\Delta t^2}{2},$$

where the acceleration $(\ddot{x}, \ddot{y})(t_0)$, may be detected by the external object sensor system, calculated from change detected external object velocities or neglected.

10. An object awareness determination system according to claim 1, characterised in that said time span $[t_{-n}, t_{-1}]$ corresponds to at least 2 seconds immediately preceding said time of first entry.

11. An object awareness determination system according to claim 1, characterised in that said time span $[_{-n}, t_0]$ corresponds to less than 10 seconds immediately preceding said time of first entry.

12. An object awareness determination system according to claim 1, characterised in that said time span $[t_{-n}, t_{-1}]$ corresponds to approximately 5 seconds immediately preceding a time of first entry ($t_0$).

13. A method for determining awareness of an object comprising the steps of:
   sensing an object within a detecting range of a host vehicle by a sensor system and generating input data relating to the object, wherein the input data includes an object position $(x, y)$, an object velocity $|(\dot{x}, \dot{y})|$ and an object direction of movement $((\dot{x}, \dot{y})/|(\dot{x}, \dot{y})|)$;
   determining a direction of gaze ($\phi_{rel, -i}$) of a user by an eye gaze monitor;
   recording the direction of gaze ($\phi_{rel, -i}$);
   determining a past host vehicle position $((x,y)_{host, past})$ and a past host vehicle yaw angle ($\phi_{-i}$);
   estimating a past trajectory of the object within a time span $[t_{-n}, t_{-1}]$ preceding a time of first entry ($t_0$) of the object into the detecting range; and
   determining awareness of the user to the object before the object has entered the detecting range based on an assessed observation by using the past host vehicle position $((x,y)_{host, past})$, the past host vehicle yaw angle ($\phi_{-i}$), the recorded direction of gaze ($\phi_{rel, -i}$), and the estimated past trajectory of the object.

14. A method according to claim 13, further comprising:
   retrieving, for a point of time $t_{-i}$ within said time span $[t_{-n}, t_{-1}]$, an object position $(x, y)(t_{-i})$ from said past trajectory; a past host vehicle position $((x,y)_{host, past})$ and a host vehicle yaw angle ($\phi_{-i}$); and a direction of gaze ($\phi_{rel, -i}$).

15. A method according to claim 14, further comprising retrieving an absolute direction of gaze ($\phi_{abs,-i}$) for the point of time $t_{-i}$ from the recorded direction of gaze ($\phi_{rel,-i}$) and the recorded host vehicle yaw angle ($\phi_{-i}$) at the point of time $t_{-i}$.

16. A method according to claim 15, further comprising determining that the user is observing the object at the point of time $t_{-x}$ within said time span $[t_{-n}, t_{-1}]$ if the object position $(x, y)(t_{-i})$ is within a sector around said absolute direction of gaze ($\phi_{abs,-i}$) at the point of time $t_{-i}$.

17. A method according to claim 16, wherein said time span $[t_{-n}, t_{-1}]$ includes a set of discrete points of time $t_i\{i=-n:-1\}$, the object position $(x, y)$ $(t_{-i})$ is determined at said discrete points of time $t_i\{i=-n:-1\}$, and that that it is determined that the user is observing the object within said time span $[t_{-n}, t_{-1}]$ if the object position $(x,y)(t_{-i})$ is within a sector around the absolute direction of gaze ($\phi_{abs,-i}$) at any of said discrete points of time $t_i\{i=-n:-1\}$.

18. A method according to claim 17, wherein it is initially determined if the user is observing the object at a point of time $(t_{-1})$ immediately preceding said time of first entry $(t_0)$, and continuing with points of time $t_i$ consecutively being more distant from the time of first entry $(t_0)$.

19. A method according to claim 18, wherein the determination is stopped for points of times being more distant from the time of first entry $(t_0)$ than a point of time $t_{-i}$ as soon as it is determined that the user is observing the object at the point of time $t_{-i}$ due to the object position being determined to be within a sector around said absolute direction of gaze at the point of time $t_{-i}$.

20. A method according to claim 13, wherein the estimation of past trajectory of the object comprises retrieving an object position $(x, y)$, an object velocity $|(\dot{x}, \dot{y})|$ and an object direction of movement $((\dot{x}, \dot{y})/|(\dot{x}, \dot{y})|)$ at or after the time of first entry $(t_0)$.

21. A method according to claim 20, wherein the estimation of past trajectory comprises estimating the object position $(x, y)(t_{-i})$ at a point of time $t_{-i}$ within said time span $[t_{-n}, t_0]$ as:

$$(x, y)(t_{-i}) = (x, y)(t_0) - (\dot{x}, \dot{y})(t_0)\Delta t - (\ddot{x}, \ddot{y})(t_0)\frac{\Delta t^2}{2},$$

where the acceleration $(\ddot{x}, \ddot{y})(t_0)$, may be detected by an external object sensor system, calculated from change detected external object velocities or neglected.

22. A method according to claim 13, characterised in that said time span $[t_n, t_{-i}]$ corresponds to at least 2 seconds immediately preceding said time of first entry.

23. A method according to claim 13, characterised in that said time span $[t_n, t_{-i}]$ corresponds to less than 10 seconds immediately preceding said time of first entry.

24. A method according to claim 13, characterised in that said time span $[t_n, t_{-i}]$ corresponds to approximately 5 seconds immediately preceding a time of first entry $(t_0)$.

* * * * *